(12) United States Patent
Dieckröger et al.

(10) Patent No.: US 7,054,560 B2
(45) Date of Patent: May 30, 2006

(54) CONFIGURATION FOR DETECTING OPTICAL SIGNALS OF A PLANAR OPTICAL CIRCUIT

(76) Inventors: Jens Dieckröger, Lofererstrasse 12, D-81671 München (DE); Frank Singer, Hochweg 51, D-93049 Regensburg (DE)

( * ) Notice: Subject to any disclaimer, the term of this patent is extended or adjusted under 35 U.S.C. 154(b) by 876 days.

(21) Appl. No.: 09/850,583

(22) Filed: May 7, 2001

(65) Prior Publication Data

US 2002/0126335 A1    Sep. 12, 2002

Related U.S. Application Data

(63) Continuation of application No. PCT/DE01/00976, filed on Mar. 9, 2001.

(51) Int. Cl.
*H04J 14/02*    (2006.01)
*H04B 10/12*    (2006.01)
*G02B 6/26*    (2006.01)

(52) U.S. Cl. .................. 398/79; 398/141; 398/142; 398/143; 398/145; 385/28; 385/32; 385/39; 385/47

(58) Field of Classification Search .............. 398/13, 398/20, 28, 33, 145, 149, 79, 141, 142, 143; 385/15, 28, 31, 32, 36, 39, 47
See application file for complete search history.

(56) References Cited

U.S. PATENT DOCUMENTS

| | | | |
|---|---|---|---|
| 4,343,532 A | * | 8/1982 | Palmer .................. 385/36 |
| 5,272,356 A | * | 12/1993 | Wen et al. ............... 257/21 |
| 5,329,392 A | * | 7/1994 | Cohen .................... 398/13 |
| 5,793,062 A | * | 8/1998 | Kish et al. ............... 257/98 |
| 6,351,575 B1 | * | 2/2002 | Gampp et al. ............ 385/14 |

FOREIGN PATENT DOCUMENTS

| | | |
|---|---|---|
| JP | 02 019 811 | 1/1990 |
| JP | 02-055304 | 2/1990 |
| JP | 03-103804 | 4/1991 |
| JP | 05-264870 | 10/1993 |
| JP | 07-159658 | 6/1995 |
| JP | 10-082925 | 3/1998 |
| JP | 11-326662 | 11/1999 |

OTHER PUBLICATIONS

Johan E. van der Linden et al.: "Cost-Effective and High-Density Integration of Monitoring Photodetector Arrays onto Polymeric Guided-Wave Components", 1998, Electronic Components and Technology Conference, XP-000803681, pp. 1012-1017.

Kwang W. Oh et al.: "Flip-Chip Packaging Using Micromachined Conductive Polymer Bumps and Alignment Pedestals for MOEMS", IEEE Journal of Selected Topics in Quantum Electronics, vol. 5, No. 1, Jan./Feb. 1999, pp. 119-126, XP-000823398.

* cited by examiner

*Primary Examiner*—M. R. Sedighian
(74) *Attorney, Agent, or Firm*—Workman Nydegger (57) ABSTRACT

A configuration for detecting optical signals of at least one optical channel of a planar optical circuit. At least one deflection device is provided, which couples the optical signals of at least one optical channel at least partly out of the plane of the circuit, and one detection unit is provided, which detects the signals that are coupled out outside the plane of the circuit. Therefore, a simple metrological monitoring of the signals of the optical channels of a planar optical circuit occurs with only slight signal losses and without undesirable crosstalk.

18 Claims, 6 Drawing Sheets

CONFIGURATION FOR DETECTING OPTICAL SIGNALS OF A PLANAR OPTICAL CIRCUIT

CROSS-REFERENCE TO RELATED APPLICATION

This application is a continuation of copending International Application No. PCT/DE01/00976, filed Mar. 9, 2001, which designated the United States.

BACKGROUND OF THE INVENTION

Field of the Invention

The invention relates to a configuration for detecting optical signals of a planar optical circuit and a reducing device having such a configuration. Detection configurations such as this serve for metrologically monitoring individual channels of a planar optical circuit.

In planar optical circuits (i.e. planar light circuit (PLC)) it is necessary to monitor the signals of the individual optical channels metrologically. An example of this is the monitoring of the optical signals before and behind a reducing array that performs a channel-dependent reduction of the level of individual data channels of the array. Different levels of the optical channels can be equalized by the channel-dependent reducing process.

But a problem with metrologically monitoring the individual channels is that the wave guide layers that guide the optical signals are typically buried in the planar optical circuit. For this reason, in detecting an optical signal in the optical planar circuit it has been necessary hitherto to guide the optical signal over integrated wave guides to the face side of the circuit, and to route it from there to a photodiode unit that is mounted at the face side. However, owing to the fact that the wave guides are all situated in one plane, disturbing crossings of the wave guides occur among the individual channels, which lead to channel-dependent losses and crosstalk.

A known reducing device has individual optical data channels of an array, in which the signals of the individual data channels are reduced in a channel-dependent fashion by reducing units, respectively, and compared to a common level. The reducing units are typically realized as thermo-optical Mach-Zehnder interferometers in which the signals of the individual data channels are distributed to two arms and merged again in one arm, potentially following a phase shift. The reduction of the optical signal being carried in the data channel can be adjusted via the phase shift.

Before and behind the reducing unit, the individual channels of the array are monitored, in which process the monitored signal is coupled into monitoring wave guides with the aid of coupling directional couplers. The signal is guided to the face side of the planar optical circuit by the monitoring wave guides, where it is detected by a photodiode array. The disadvantage of this configuration is that each monitoring wave guide crosses between 0 and n−1 wave guides of the array on its path to the photodiode array, depending on the channel. The crossings of the monitoring wave guides with the wave guides that carry the signal lead to channel-dependent losses and cross-talk with the other wave guides of the array.

SUMMARY OF THE INVENTION

It is accordingly an object of the invention to provide a configuration for detecting optical signals of a planar optical circuit that overcomes the above-mentioned disadvantages of the prior art devices of this general type, which makes it possible to detect the optical signals easily. The aim is to accomplish a simple metrological monitoring of the signals of the optical channels of a planar optical circuit while reducing the signal losses in the wave guides and eliminating undesirable crosstalk. In particular, this kind of metrological monitoring should be provided for a reducing device.

With the foregoing and other objects in view there is provided, in accordance with the invention, a planar optical circuit assembly. The planar optical circuit assembly contains a planar optical circuit having at least one optical channel for transmitting optical signals, at least one deflection device for coupling the optical signals of the optical channel at least partially out of a plane of the planar optical circuit, and a detection unit for detecting the optical signals coupled out outside the plane of the planar optical circuit by the deflection device.

Accordingly, the invention provides for the utilization of a deflection device by which the optical signals of at least one optical channel are coupled from the plane of the circuit and subsequently detected by a detection unit that is disposed outside the plane of the circuit. A hybrid structure is thus proposed, containing a planar optical circuit, an optical deflection device, and a detection unit, with the deflection device in particular being integrated into the planar optical circuit.

Since the optical signals of the optical channel are coupled from the plane of the optical circuit perpendicularly or obliquely relative thereto, the detection unit can be disposed directly at the location of the out-coupling. This local configuration of the detection unit eliminates the necessity of leading monitoring wave guides to the face side of the optical circuit, and therefore a disturbing crossing of the monitoring wave guides with the main wave guides no longer occurs. This substantially facilitates the metrological monitoring process.

An additional advantage of the inventive solution is that the overall component size is smaller, since the detection unit can be disposed directly on the planar optical circuit and no longer has to be disposed at the face side. Besides this, the resultant chip area is smaller, since the monitoring signals no longer have to be led to the face side of the planar optical circuit.

In a preferred development, the deflection device is fashioned as a prism that is inserted at least partway into the plane of the circuit in the hybrid configuration. One surface of the prism serves as a deflecting mirror by which the optical signals of a wave guide are reflected from the plane of the circuit to the detection unit. The optical signal can be reflected from the plane of the circuit both vertically and at an angle not equal to 90°, whereby the detection unit must be suitably disposed, accordingly.

The term prism refers to any body having at least two mutually inclined surfaces. One of these surfaces is fashioned as a deflecting mirror.

The mirror surface of the prism is preferably highly reflective to defined wavelengths by virtue of an optical coating. This guarantees that the optical signals of specific wavelengths are coupled from the wave guide completely. In this regard, it can be provided that the mirror surface of the prism is transparent to other wavelengths, so that the signals of these other wavelengths pass through the prism substantially undisturbed and travel in the wave guide beyond the prism. The aforementioned optical coating of the prism is expediently accomplished prior to the optical integration into the planar optical circuit.

Owing to the fact that the prism serving as the deflection device represents an external unit that is produced as a single component, it is advantageously possible to optimize the prism prior to its configuration in the planar optical circuit, namely to construct ideally reflecting surfaces.

In another development of the invention, the mirror surface of the prism is constructed only as a semi-permeable mirror. In this way, it is possible to couple the signals out of the optical circuit only partially, with the portion of the signals that is not coupled out passing through the prism and being forwarded in the respective wave guide. In the case of monitoring an optical channel, this construction eliminates the need to construct and then monitor a separate monitoring channel.

In a preferred development of the invention, the optical deflection device is inserted at least partway into depressions, or trenches, which are installed in the surface of the planar optical circuit by etching, for example, and which interrupt or terminate respective wave guides that are constructed in the circuit. The depth of the trenches preferably equals 60 μm, since this etching depth is typically also used for other functional structures. This way, the etching of the trenches in the chip production process can be performed without additional outlay.

The optical deflection device is constructed in the preferred development as a prism which contains a structuring that makes it possible to insert the prism easily and in a self-aligning fashion into the depressions or trenches that are constructed in the planar optical circuit. To this end, the prism preferably contains recesses or longitudinal grooves that define tooth-shaped projections that are constructed to fit the trenches that are constructed in the planar optical circuit. This way, the depth to which the teeth of the prism protrude into the trenches of the planar optical circuit can be advantageously adjusted by way of the depth of the recesses or of the tooth-shaped projections. Preferably, the tooth-shaped projections (prism teeth) are approximately 40 μm deep, i.e. a smaller depth than the trenches that are constructed in the chip. This achieves a high process tolerance for the depth of the prism teeth.

It is within the scope of the invention to provide a separate prism for each optical data channel of the planar optical circuit that must be detected, which is not connected to the prisms of the other data channels. However, in a preferred development it is provided that the prism be constructed as a prism strip containing a plurality of prism teeth having a mirrored surface, with each prism tooth having a wave guide, i.e. an optical channel of the planar optical circuit, allocated to it. The advantage of utilizing a prism strip relates to simpler production and alignment, since the prism strip has to be correctly aligned a single time only. This is preferably accomplished automatically by constructing prism teeth, or projections, at the prism strip, which correspond precisely to allocated trenches in the surface of the planar optical circuit. Thus the principle of insertion is convenient in terms of production and is self-aligning.

In a preferred development of the invention, the detection unit, which is allocated to every optical channel to be detected, is disposed directly on the surface of the planar optical circuit. This produces an extremely space-efficient configuration with local detection of the signals. A configuration of the detection unit directly on the surface of the planar optical circuit is preferred particularly for geometries in which the light signals are coupled out of the plane of the planar optical circuit in an oblique fashion, for instance when the signal is obliquely reflected back onto a detection unit by the deflecting mirror of a prism.

But given a vertical coupling of the optical signal out of the planar optical circuit, it is advantageous to dispose the detection unit on a planar surface of the deflection device. The planar surface serves to mechanically secure one or more detection units.

Preferably, the planar surface of the deflection device also serves the contacting of the detection units. To this end, a metallization is installed on the planar surface of the deflection device, which serves as at least one bonding surface of at least one detection unit. In case the two contacts of the detection units are disposed on different sides, the metallization makes an electrode available for a plurality of detection units, thereby reducing the number of necessary contactings. The second contact of a detection unit is accomplished by a boding wire. In case the two contacts of a detection unit are disposed on the same side of the detection unit, the metallization can form two respective contact surfaces for bonding a detection unit, so that bonding wires are entirely unnecessary. Alternatively, the two contacts of the detection units are realized by bonding wires.

A photodiode or an array of photodiodes is preferably used as the detection unit. In a preferred development, it is provided that the photodiode be placed on the planar surface of the prism upside down. This is particularly advantageous given high data rates, since it increases the detection speed of the photodiode. This has to do with the fact that, in the normal configuration of the photodiode, electron hole pairs that are generated by photons wander to the surface only relatively slowly.

In a preferred application of the invention, the inventive configuration for detecting optical signals is part of a reducing device in which a plurality of optical channels pass through respective reducing units for the purpose of equalizing the signals. Each optical main channel has at least one monitoring channel allocated to it, into which a specific percentage of the optical power of the optical main channel is coupled. The monitoring channels are terminated by respective detection units; i.e., the optical signal of the monitoring channel is coupled completely out of the planar optical circuit and then detected.

Prior to their termination, the monitoring channels extend substantially parallel to the respective optical main channels without crossing each other or the main channels. An essential advantage of the invention relates to the fact that, owing to the local vertical coupling of signals out of the planar optical circuit, the individual wave guides no longer need to cross, and so crosstalk and channel-dependent losses are prevented.

It is preferably provided that the main channel run undisturbed in the planar optical circuit at the side of a tooth-shaped projection of the deflection device, while the signal of the appertaining parallel monitoring channel is coupled out by the inventively directed beam deflection and detected. Crosstalk with the main channel or other main channels is thereby minimized.

Other features which are considered as characteristic for the invention are set forth in the appended claims.

Although the invention is illustrated and described herein as embodied in a configuration for detecting optical signals of a planar optical circuit, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

In all the figures of the drawing, sub-features and integral parts that correspond to one another bear the same reference symbol in each case. Referring now to the figures of the drawing in detail and first, particularly, to FIG. 7 thereof, there is shown an example of a reducing device such as is known from the prior art. Individual optical data channels 11 to 1n of an array 10 are guided through a reducing unit 2, in which the signals of the individual optical data channels 11 to 1n are reduced in a channel-dependent fashion by reducing units 21–2n, respectively, and compared to a common level. The reducing units 21–2n are typically realized as thermo-optical Mach-Zehnder interferometers in which the signals of the individual data channels 11 to 1n are distributed to two arms and merged again in one arm, potentially following a phase shift. The reduction of the optical signal being carried in the data channel can be adjusted via the phase shift.

Figure 7:
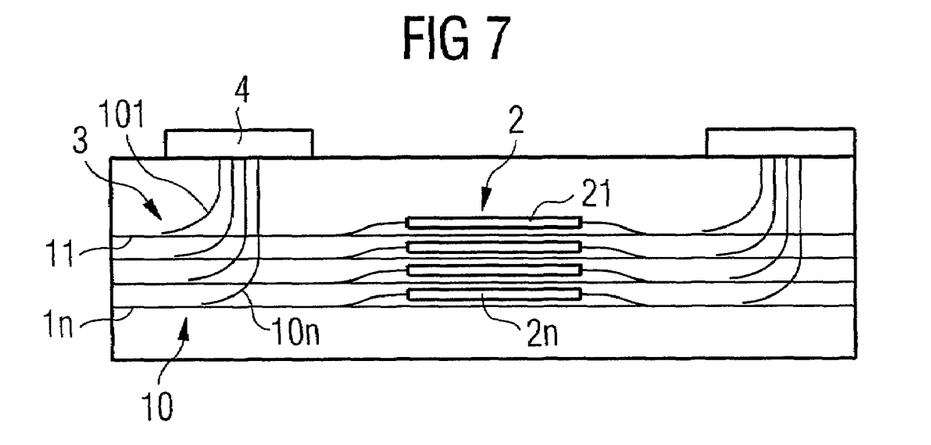
FIG. 7 is a view of the multichannel reducing device having signal monitoring as known in the prior art.

Before and behind the reducing unit 2, the individual data channels 11–1n of the array 10 are monitored, in which process a monitored signal is coupled into monitoring wave guides 101–10n with the aid of coupling directional couplers 3. The signal is guided to a face side of the planar optical circuit by these monitoring wave guides, where it is detected by a photodiode array 4. The disadvantage of this configuration is that each monitoring wave guide 101–10n crosses between 0 and n−1 wave guides of the array in its path to the photodiode array 4, depending on the channel. The crossings of the monitoring wave guides 101–10n with the wave guides 11–1n that carry the signal lead to channel-dependent losses and crosstalk with the other wave guides of the array.

Figure 6:
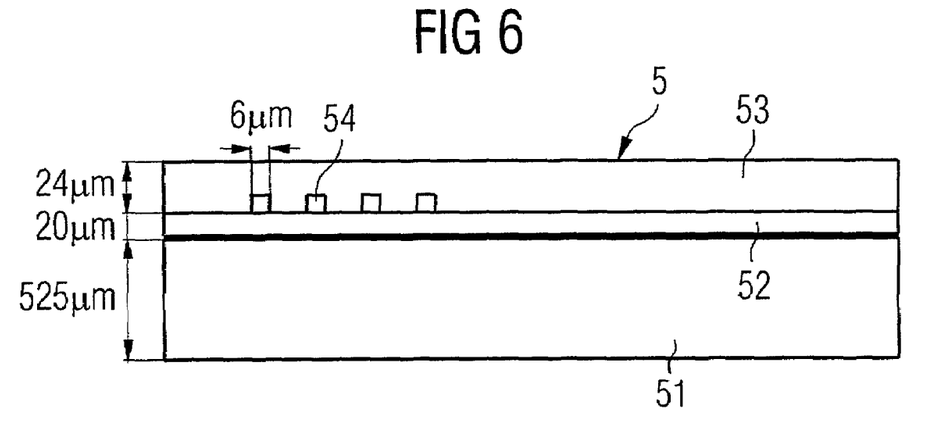
FIG. 6 is a cross-sectional view through the planar optical circuit having integrated optical wave guides.

To provide a better understanding of the invention, the conventional construction of a planar optical circuit (PLC) 5 will be described with reference to FIG. 6. To produce the PLC 5, several $SiO_2$ layers having different refractive indices are deposited on a silicon wafer 51. The layers are formed of what is known as a buffer layer 52, a core layer 54, and a cover layer 53. The core layer 54, which is situated between the buffer layer 52 and the cover layer 53, contains the largest refractive index. Before the core layer 54 is covered with the cover layer 53, the core layer 54 is structured with the aid of a photolithographically produced mask (e.g. AZ resist) and an etching method (e.g. reactive ion etching (REI)) in such a way that individual ribs 54 are all that remains of the core layer 54. The ribs 54 are then covered with the cover layer 53 and form the optically conductive wave guide core. The core is disposed approximately 20 µm deep in the $SiO_2$ layer system, which is approximately 40 µm thick, and it contains a typical cross-section of approximately 6×6 µm.

In the prior art, in order to detect the optical signals that are carried in the wave guide cores 54, it is necessary to lead the wave guide cores 54 to the face side of the PLC 5 and to detect them there using a detection unit, as described above with reference to FIG. 7.

Figure 1:
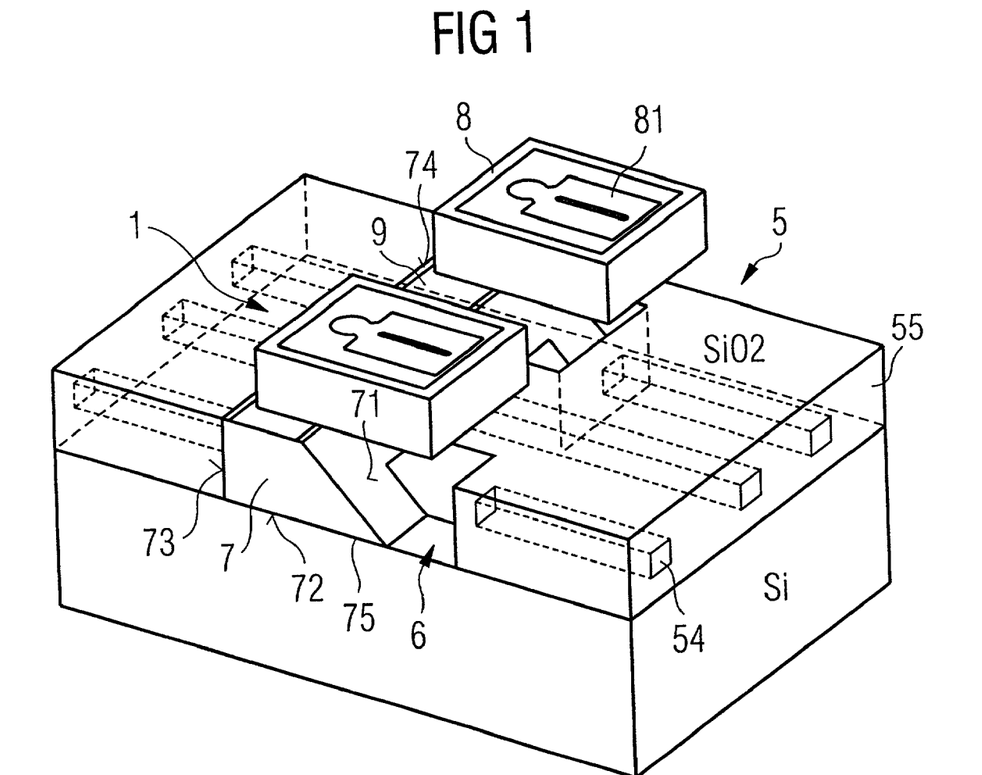
FIG. 1 is a perspective view of a configuration for detecting optical signals of a planar optical circuit according to the invention.

An inventive detection unit 1 is represented in FIG. 1. In accordance herewith, to detect an optical signal running in the wave guide 54, or in the wave guide core 54, a recess, that is to say a trench 6, is installed in an $SiO_2$ layer 55 (corresponding to the cover layer 53 and the buffer layer 52 in FIG. 6), which accommodates the wave guide 54. The trench 6 contains vertical walls and is preferably produced by an etching method. In the etching process, it is expedient to etch the trenches 6 approximately 60 µm deep, since this deepetch step is also performed for other functional structures in reducing devices.

To deflect the optical signal of the wave guide 54, a prism 7 is inserted into the trench 6, which has a first oblique reflective surface 71, which faces the wave guide core 54, and a second surface 72, which runs parallel to a surface of the trench 6. A rear surface 73 abuts the layer system 55 and the continuing wave guide 54 optimally closely, so that signals that are guided through the prism 7 are forwarded with optimally minimal disturbance. A fourth, flat surface 74 of the prism 7 runs parallel to the surface of the planar light circuit 5 and is provided with a continuous metallization 9.

Figure 2A:
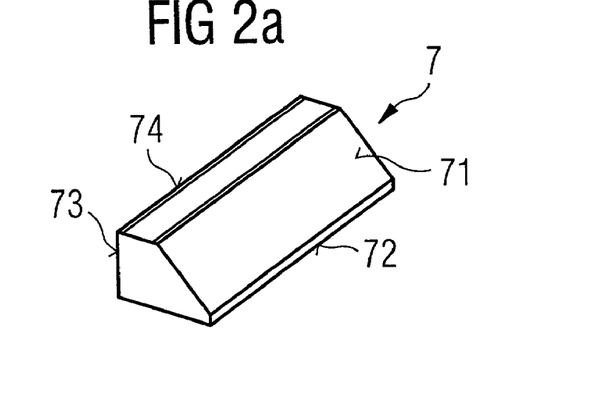
FIGS. 2a–2e are perspective views showing individual steps of a method of production of the configuration as represented in FIG. 1.

The prism 7 is mounted on the surface of the PLC 5 by gluing or soldering, for example. It preferably contains glass, namely boron silicate glass. The parts of the prism 7 that protrude into the trenches 6 of the PLC 5 represent slanted tooth-shaped projections 75 (which will be described below with reference to FIGS. 2a–2b), which are hereinafter referred to as prism teeth or simply teeth 75. Light that is conducted in the wave guide 54 is deflected by the mirrored surface 71 of the prism teeth 75 in the direction of a detection unit 8. It can be provided that the surface 71 be highly reflective only to specific wavelengths, while other wavelengths penetrate the prism 7 and are forwarded in the wave guide cores 54 substantially undisturbed.

It is also possible for the mirrored surface 71 to represent a merely semi-permeable mirror, so that only part of the power of the optical signals is coupled out, while another part is forwarded in the wave guide 54.

The detection unit 8 is preferably realized as a photodiode which is bonded via the metallization 9 of the surface 74 of the prism 7, and by bonding wires that contact bonding surfaces 81 of the photodiode 8.

It is noted that in accordance with FIG. 1 not necessarily every wave guide 54 is interrupted or even terminated by a detection unit 8. In the illustration in FIG. 1, the center wave guide passes the prism tooth 75 undisturbed without its signal being disturbed by the signal of the neighboring wave guide 54, which is coupled out vertically. This type of sequence, wherein a signal detection takes place only in every second wave guide 54, respectively, is particularly expedient for monitoring the optical signals by reducing units, whereby the undisturbed wave guide 54 represents the main channel, and the wave guide 54 with the detection unit 8 represents the monitoring channel.

The production and precise construction of the units of the detection configuration 1 will now be described in detail with reference to FIGS. 2a–2e. In accordance with FIG. 2a, the top, planar surface 74 of the prism 7, which is provided with the surfaces 71, 72, 73, 74, is initially metallized with gold in order to generate a contact surface, and the surface 71, which is preferably inclined 45°, is mirrored.

Figure 2B:
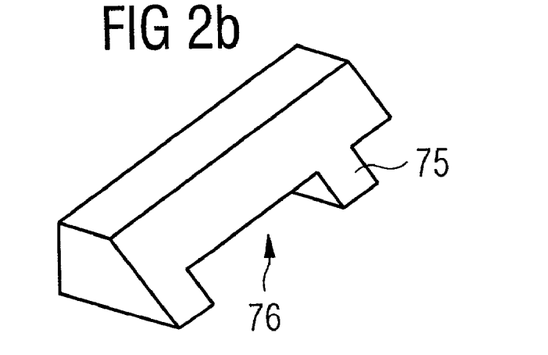
Figure 2C:
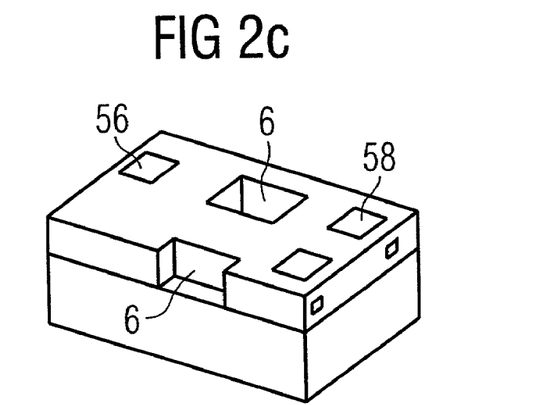

Next, in accordance with FIG. 2b, longitudinal grooves 76, which define the tooth-shaped projections 75, i.e. the prism teeth 75 in accordance with FIG. 1, are installed in the bottom 72 of the prism 7 by sandblasting or sawing. FIG. 2c shows a chip that has been produced in a $SiO_2$/Si material system, having the planar optical circuit in which the recesses 6, i.e. the trenches 6, have been installed by etching. FIG. 2c also shows contact surfaces 56, 58 for bonding the photodiodes 8. The teeth 75 of the prism 7 correspond in size to the trenches 6 of the chip.

Figure 2D:
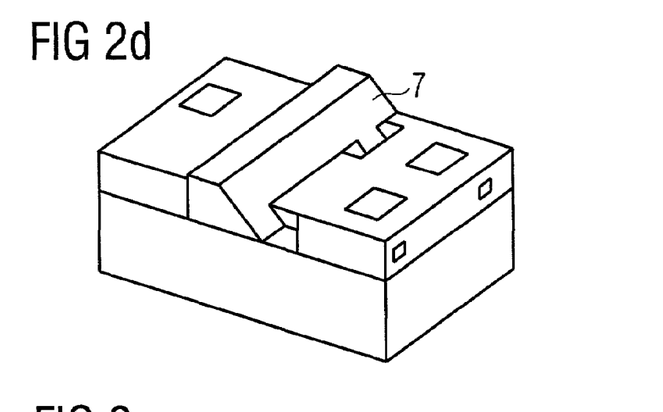

In accordance with FIG. 2d, the prism 7 is automatically aligned when it is mounted on the $SiO_2$/Si chip, namely by way of the aligning of the prism teeth 75 in the trenches 6. A self-alignment takes place.

It is preferably provided that the prism teeth 75 have a depth of approximately 40 μm relative to the surface of the PLC 5, so that the teeth 75 that protrude into the trenches 6 have a smaller depth than the trenches 6, which preferably have a depth of 60 μm. This way, a high processing tolerance for the depth of the prism teeth 75 is achieved.

After the prism 7 is affixed to the PLC 5, the photodiodes 8 are mounted on the surface 74 of the prism 7. Each photodiode 8 is disposed directly above the prism tooth 75, so that light that is reflected up vertically by the prism tooth 75 is immediately detected by the photosensitive surface of the photodiode 8. The photodiodes 8 are contacted by way of the bonding surfaces 56, 58, from which gold bonding wires 59 are respectively drawn to the metallization 81 of the photodiodes 8 and the metallization 9 on the surface 74 of the prism, respectively.

Alternatively, the two terminals of the photodiode 8 are constructed on the top of the photodiode. Then, the two contacts are produced by the bonding wires 59, and the metallization 9 on the surface of the prism can be forgone.

Figure 2E:
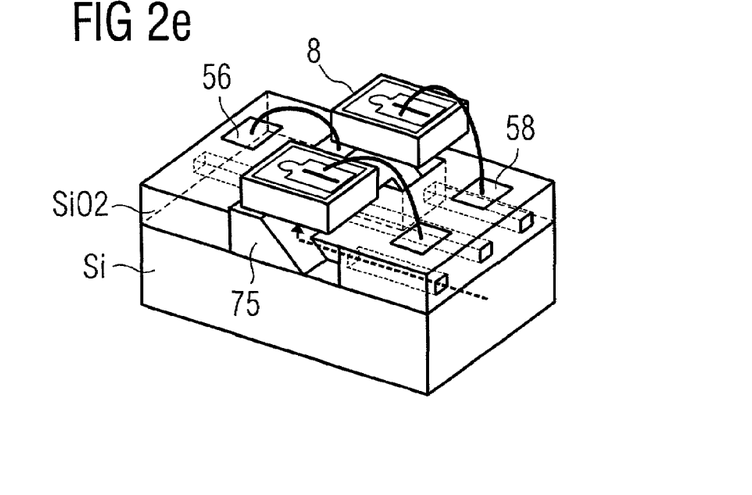

As indicated in FIG. 2e, the optical signals that are carried in the light wave guide 54 are reflected at specified wavelengths to the detection unit 8 by the mirror surface 71 of the prism 7 and detected by the detection unit 8.

In the exemplifying embodiment of FIGS. 1 and 2a–2e, the photodiodes 8 can also be mounted on the prism 7 upside down. Thus, the p-n junction of the photodiodes 8, which abuts the surface, is situated facing the light signal, so that faster switching times can be realized. The contacting of the contact surface 81 (p-contact) of the photodiode 8 is accomplished by way of the metallization 9, which then cannot be constructed in a contiguous fashion. The additional (n–) contacting is accomplished by the bonding wire.

Alternatively, for the two contacts of the upside-down photodiode 8, contact surfaces are provided by the metallizations 9 on the surface 74 of the prism. Advantageously, the use of the bonding wires 59 to contact the photodiodes 8 can then be entirely forgone.

Figure 3:
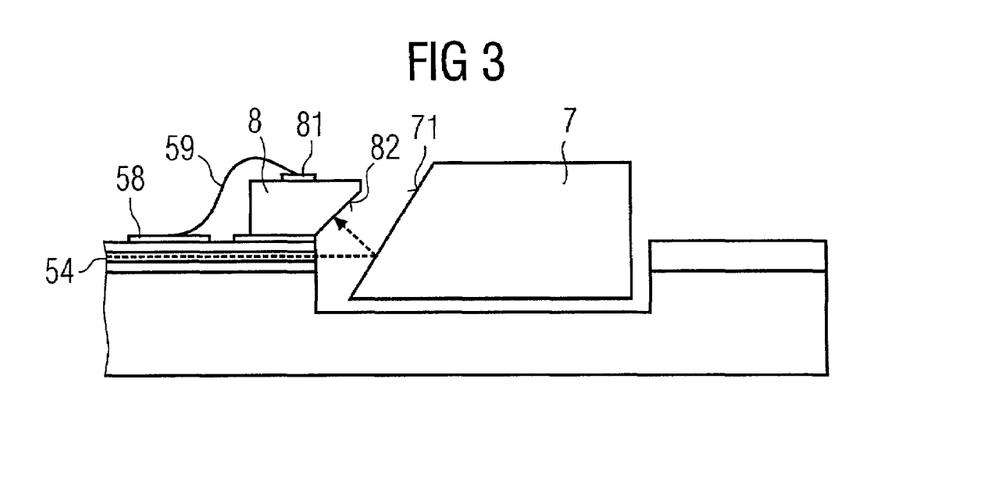
FIG. 3 is a side-elevational view of an alternative development of the configuration for detecting the optical signals of the planar optical circuit.

FIG. 3 shows an alternative detection configuration wherein the optically coated mirror surface 71 of the prism 7 runs at an angle not equal to 45° to the surface of the PLC 5. Accordingly, light that is coupled out of the optical channel 54 is reflected back obliquely and coupled out of the PLC 5 in an oblique direction. Accordingly, the photodiode 8 is disposed directly on the surface of the PLC 5 in this exemplifying embodiment. The photodiode 8 thus forms an oblique detection edge 82. For the contacting of the photodiode 8, in the example of a p-n photodiode the p contact is fashioned on the top side of the photodiode 8, and the n contact, which simultaneously forms the soldering surface for mounting the photodiode 8, is fashioned on the PLC 5. FIG. 3 also shows the contact surface 58, to which the bonding wire 59 is drawn from the p-contact of the photodiode 8.

Figure 4A:
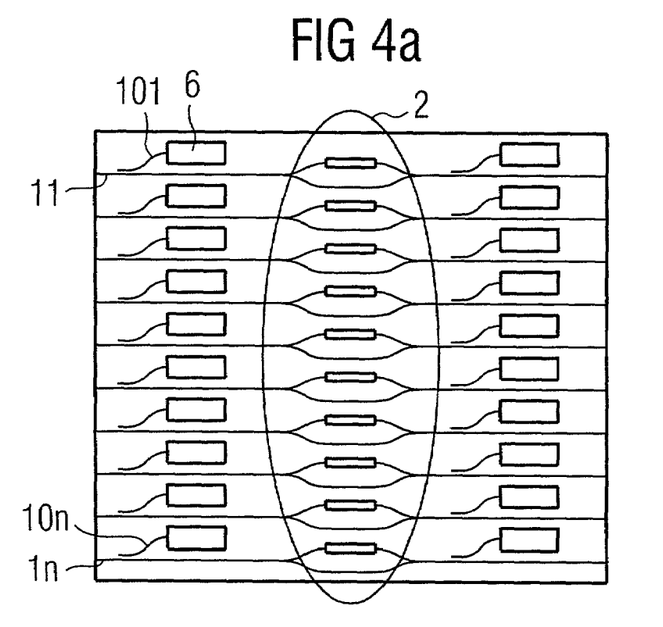
FIG. 4a is a plan view of a multichannel reducing unit with detection configurations for metrologically monitoring wave guides, in which the deflection devices and detection units are not included.
Figure 4B:
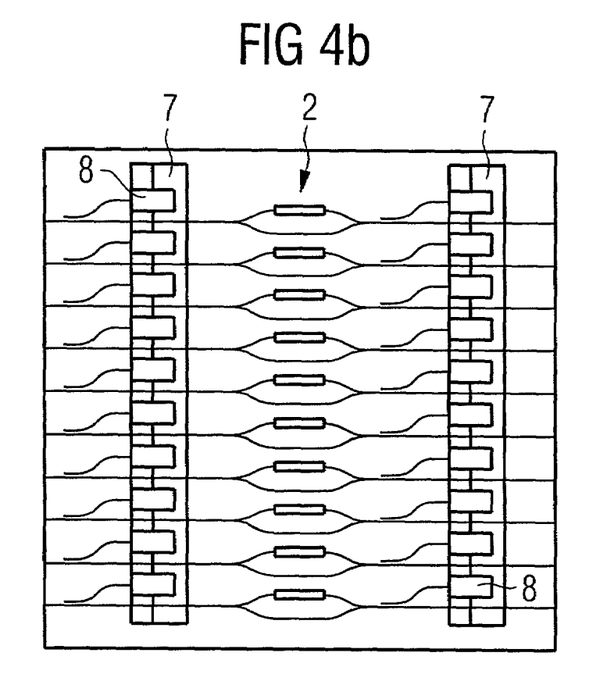
FIG. 4b is a plan view of the multichannel reducing device of FIG. 4a, with additional deflection devices and the detection units.
Figure 5:
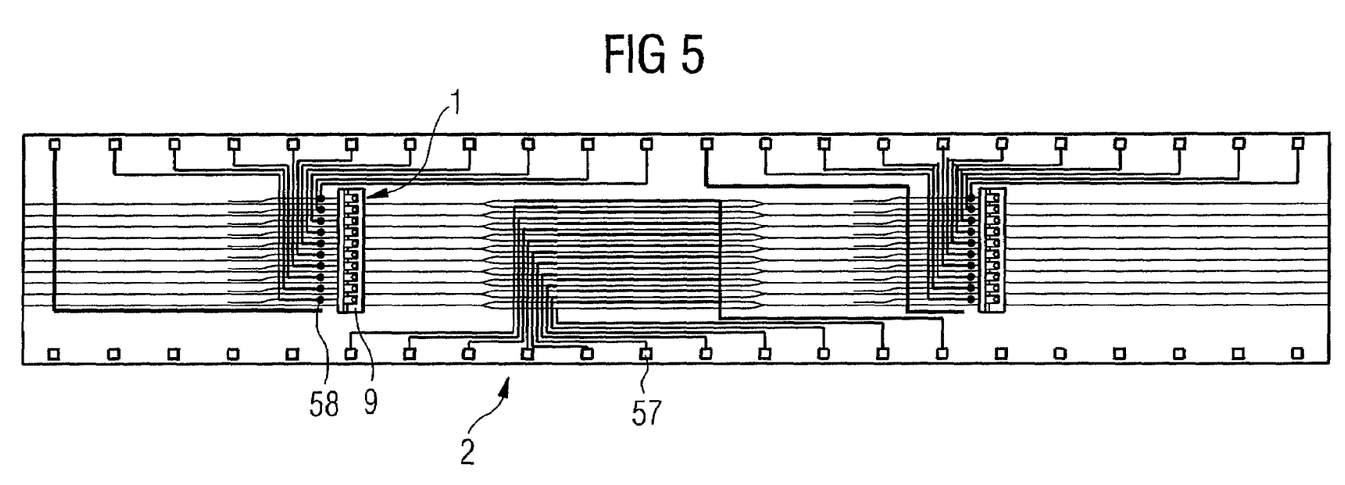
FIG. 5 is a view of the multichannel reducing device as represented in FIG. 4, including a metallization of a surface of the prism and bond pads.

FIGS. 4a, 4b and 5 show the application of the inventive detection configuration in a 10-channel reducing device. The actual reducing unit 2 contains thermo-optically controllable Mach-Zehnder interferometers, as described above with reference to FIG. 7. Each of the monitored optical channels 11–1n has the monitoring channel 101–10n allocated to it, into which approximately 3% of the light power of the optical channel 11–1n is coupled by a coupler. The spacing between the individual channels 11–1n preferably equals 250 μm or 500 μm.

The monitoring channel 101–10n is terminated by the detection configuration in accordance with FIG. 1, and the light of the respective monitoring channel 101–10n is captured by the photodiode 8. To this end, a plurality of approximately 60-μm-deep trenches 6 with straight edges are etched into the surface of the PLC 5 in accordance with FIG. 4a, each of which interrupts or terminates a respective monitoring channel 101–10n.

In accordance with FIG. 4b, the prism teeth 75 of the prism 7 are inserted into the trenches 6 as represented in FIG. 1. Since the prism 7 is constructed as a strip, it can also be referred to as a prism strip 7 with the prism teeth 75. The photodiodes 8 for detecting the monitoring signal are affixed to the prism strip 7, as described above with reference to the preceding exemplifying embodiments. The monitoring channels 101–10n are utilized to measure the optical power that the optical signals contain in the individual channels 11–1n before and behind the reducing device 2. With this information, a control loop for the reducing device 2 can be set up in known fashion.

Compared to the representation in FIGS. 4a–4b, the representation of FIG. 5 includes additional bond pads 58 for the p contacts of the photodiodes as well as bond pads 57 for heating elements of the Mach-Zehnder interferometers of the reducing unit 2. The electrical contacting of the n contacts of the photodiodes is accomplished by the continuous metallization 9 of the prism 7, which serves as a common n contact. The construction of the prism 7 and the photodiodes 8 is as represented in connection with FIGS. 1 and 2.

The construction of the invention is not restricted to the above-described exemplifying embodiments. For example, it is also possible to use a hollow mirror or some other structure instead of the prism 7 as the deflection device 7 for coupling light out of the plane of the planar optical circuit 5. It is also noted that the application of the inventive detection configuration is in no way limited to the reducing device. The inventive detection configuration can be utilized whenever signals of planar optical circuits must be detected. All that is essential to the invention is that the deflection device be provided, which couples the optical signals of at least one optical channel at least partially out of the plane of the planar circuit, so that they can be detected by a detection unit outside the plane of the circuit.

We claim:

1. A reducing assembly, comprising:
a planar optical circuit;
a plurality of reducing units disposed in said planar optical circuit;
a plurality of optical main channels passing through said reducing units;
monitoring channels allocated to said plurality of optical main channels, said monitoring channels receiving a specific percentage of optical power of an associated one of said main channels coupled to an associated one of said monitoring channels and said monitoring channels outputting optical signals;
at least one deflection device being a prism inserted into the plane of said planar optical circuit, said deflection device coupling the optical signals of said monitoring channels at least partially out of a plane of said planar optical circuit; and
a plurality of detection units for detecting the optical signals coupled out outside the plane of said planar optical circuit by said deflection device;
said prism having a surface constructed as a deflecting mirror by which the optical signals are reflected out of the plane of said planar optical circuit, said prism being a prism strip to which said plurality of detection units are allocated, the optical signals of said monitoring optical channels are respectively reflected by a region of said prism strip and guided onto a corresponding one of said detection units.

2. The reducing assembly according to claim 1, wherein said monitoring channels run parallel to said optical main channels without crossing each other or said optical main channels.

3. The reducing assembly according to claim 1, wherein said deflection device has tooth-shaped projections and said optical main channels run in said planar optical circuit undisturbed at a side of a respective tooth-shaped projection.

4. The configuration according to claim 1, wherein the optical signals are coupled out of the plane of said planar optical circuit vertically.

5. The configuration according to claim 1, wherein the optical signals are coupled out of the plane of said planar optical circuit at an angle not equal to 90°.

6. The configuration according to claim 1, wherein said surface of said prism strip is highly reflective at least to defined wavelengths by virtue of said surface being said deflecting mirror.

7. The configuration according to claim 1, wherein said surface is semi-permeable to the optical signals of said optical channel, with the optical signals that are not coupled out being forwarded in said optical channel.

8. The configuration according to claim 1, wherein said planar optical circuit has trenches formed therein, into which at least parts of said deflection device are inserted.

9. The configuration according to claim 8, wherein said trenches are 60 µm deep.

10. The configuration according to claim 1, wherein said detection unit is disposed on said planar optical circuit.

11. A reducing assembly, comprising:
a planar optical circuit;
a plurality of reducing units disposed in said planar optical circuit;
a plurality of optical main channels passing through said reducing units;
monitoring channels allocated to said plurality of optical main channels, said monitoring channels receiving a specific percentage of optical power of an associated one of said main channels coupled to an associated one of said monitoring channels and said monitoring channels outputting optical signals;
at least one deflection device being a prism inserted into the plane of said planar optical circuit, said at least one deflection device coupling the optical signals of said monitoring channels at least partially out of a plane of said planar optical circuit, said prism having a step profile with at least one tooth-shaped mirrored projection, said tooth-shaped mirrored projection inserted into said trench of said planar optical circuit; and
a detection unit for detecting the optical signals coupled out outside the plane of said planar optical circuit by said deflection device;
said prism having a surface constructed as a deflecting mirror by which the optical signals are reflected out of the plane of
said planar optical circuit and onto said detection unit and said surface is semi-permeable to the optical signals of said optical channel, with the optical signals that are not coupled out being forwarded in said optical channel.

12. The configuration according to claim 11, wherein said step profile in a direction perpendicular to the plane of said planar optical circuit is approximately 40 µm deep.

13. A reducing assembly, comprising:
a planar optical circuit;
a plurality of reducing units disposed in said planar optical circuit;
a plurality of optical main channels passing through said reducing units;
monitoring channels allocated to said plurality of optical main channels, said monitoring channels receiving a specific percentage of optical power of an associated one of said main channels coupled to an associated one of said monitoring channels and said monitoring channels outputting optical signals;
at least one deflection device having a planar surface, said at least one deflection device coupling the optical signals of said monitoring channels at least partially out of a plane of said planar optical circuit; and
a detection unit disposed on said planar surface for detecting the optical signals coupled out outside the plane of said planar optical circuit by said deflection device.

14. The configuration according to claim 13, wherein said deflection device is a prism inserted into the plane of said planar optical circuit, said prism having a surface constructed as a deflecting mirror by which the optical signals are reflected out of the plane of said planar optical circuit and onto said detection unit.

15. The configuration according to claim 14, wherein said detection unit is one of a plurality of detection units and said optical channel is one of a plurality of optical channels, said prism is a prism strip to which said plurality of detection units are allocated, the optical signals of said optical channels are respectively reflected by a region of said prism strip and guided onto a corresponding one of said detection units.

16. The configuration according to claim 13, wherein said deflection device has a metallization layer disposed on said planar surface and said metallization layer serves as at least one contact surface for said detection unit.

17. The configuration according to claim 16, wherein said deflection device is a prism strip and said metallization layer is constructed as a continuous surface of said prism strip.

18. The configuration according to claim 17, wherein said detection unit is a photodiode disposed upside down on said metallization layer of said prism.

* * * * *